UNITED STATES PATENT OFFICE.

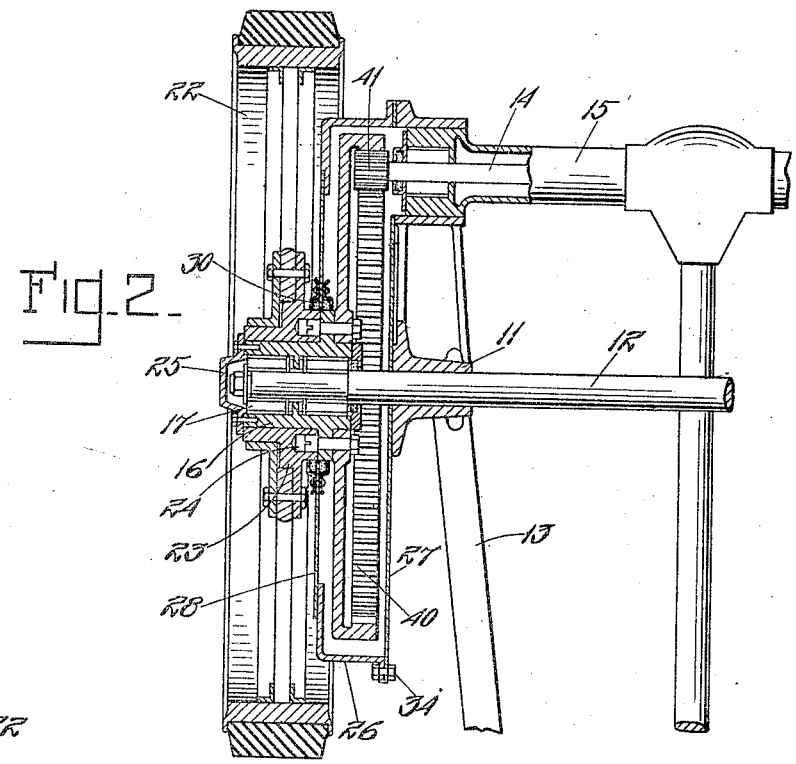

STEPHEN I. FEKETE AND STUART G. BAITS, OF DETROIT, MICHIGAN, ASSIGNORS TO ESSEX MOTORS, OF DETROIT, MICHIGAN, A CORPORATION OF MICHIGAN.

WHEEL-DRIVE.

1,319,519.  Specification of Letters Patent.  Patented Oct. 21, 1919.

Application filed July 25, 1918. Serial No. 246,639.

*To all whom it may concern:*

Be it known that we, STEPHEN I. FEKETE, a subject of the King of Hungary, and STUART G. BAITS, a citizen of the United States, both residing at Detroit, county of Wayne, State of Michigan, have invented a certain new and useful Improvement in Wheel-Drives, of which the following is a specification, reference being had therein to the accompanying drawings.

Our invention has for its object to provide an improved wheel drive for motor trucks, tractors and other motor vehicles. It has been found in the construction and operation of such vehicles that the so-called internal gear drive is for many reasons advantageous, particularly since the entire load carried by the wheel may be supported upon a load carrying axle thus freeing the driving axle from all strains, incident to the support of the load. Great difficulty has been experienced, however, with drive mechanism of this character because the driving gears are exposed and rapidly accumulate grit in the lubricant so that a grinding compound is formed which wears out the gears, shortens their life and renders the mechanism noisy. These difficulties are particularly serious in tractors and trucks which are frequently operated in places where dust is excessive, and, to a less extent in other vehicles, such for instance as taxi-cabs.

Our invention provides a drive mechanism of the general type mentioned above which may be housed and the housing partly filled with oil so that the gears will run in an oil bath and will be fully protected from dust so that the oil cannot accumulate grit. Our invention is applicable not only to a drive mechanism of the internal gear type, that is one in which an annular spur gear is carried on the wheel and is engaged by a pinion on the drive shaft, but also one of the type in which an external spur gear is carried on the wheel and is engaged by a pinion on the drive shaft.

The invention will be fully understood from the following description when taken in connection with the accompanying drawings and the novel features thereof will be pointed out and clearly defined in the claim at the close of this specification.

In the drawings, Figure 1 is a section of a wheel drive mechanism embodying our invention as applied to an external gear drive mechanism for a truck.

Fig. 2 is a similar view showing our invention applied to an internal gear drive mechanism for a truck.

Referring now to the drawings, at 11 is shown the frame, at 12 is shown the load carrying axle and at 13 is shown a reach. The driving axle is designated 14 being carried in a housing 15.

At 16 is shown a hub between which and the load carrying axle is located a roller bearing 17. To the hub 16 is secured the gear 18 by bolts 20, the heads of which project beyond the hub flange as shown. In this view an exterior spur gear having teeth on its exterior periphery is shown. This gear meshes with a pinion 19 on the drive shaft. The wheel is shown at 22 and is provided with a separate hub 23 having holes 24 corresponding in number and position with the bolts 20. The holes 24 receive the heads of the bolts 20 so that the bolts 20 furnish the driving connection not only between the gear 18 and the hub 16 but also between the hub 16 and the wheel 22. The wheel is held in place by the hub cap 25.

At 26 is shown a flange secured by bolts 34 to a disk 27 which is carried by the frame of the machine or by the load carrying axle. The disk 27 is pierced at the proper point to permit the driving axle 14 and pinion 19 to extend into the housing. The flange 26 is inturned as shown at *a* and carries a disk 28 which extends inwardly between the large gear and the wheel. The disk 28 is provided with a hole through which the hub of the wheel projects. An oil tight connection between the disk 28 and the hub is made by means of a pair of felt washers 30 held between a pair of flanges 32 which are riveted or otherwise suitably secured to the disk 28.

The housing composed of the disk 27, flange 26 and disk 28 completely surrounds the gear 18 and pinion 19 and may be filled with oil to any suitable depth so that the gears contained within it will run in a bath of oil. The felt washers make an oil and dust tight connection so that no dust or grit can enter the housing nor can the oil escape. The result is that the gears are perfectly lubricated and protected and therefore have a much longer life.

Fig. 2 illustrates the application of our invention to an internal gear drive. The mechanism shown in this figure is identical with that already described except that there is an internal gear 40 meshing with a pinion 41 instead of a spur gear and pinion.

What we claim is:

The combination of a load carrying axle, a rotatable hub thereon, a gear, bolts having projecting heads, said bolts securing the gear to the hub, a wheel mounted on said hub and having holes receiving the heads of said bolts, means for securing the wheel on the hub, a non-rotatable housing surrounding said gear and extending between the gear and the wheel, and means making an oil tight joint between the housing and the hub.

In testimony whereof we affix our signatures.

STEPHEN I. FEKETE.
STUART G. BAITS.